United States Patent [19]
Sanchez

[11] 3,899,846
[45] Aug. 19, 1975

[54] REMOVABLE CONVERTER FOR A FISHING POLE WITH AUTOMATIC RELEASE FOR FISHING LINE

[76] Inventor: George R. Sanchez, 502 Berry Ave., Hayward, Calif. 94544

[22] Filed: Sept. 9, 1974

[21] Appl. No.: 504,448

[52] U.S. Cl.................................. 43/25; 43/43.12
[51] Int. Cl............................................ A01k 87/00
[58] Field of Search ................... 43/43.12, 25, 22, 4

[56] References Cited
UNITED STATES PATENTS

| | | | |
|---|---|---|---|
| 2,749,649 | 6/1956 | Fitzsimmons....................... | 43/43.12 |
| 3,358,399 | 12/1967 | Waldmann............................... | 43/4 |
| 3,659,370 | 5/1972 | Ritter................................. | 43/43.12 |

Primary Examiner—Louis G. Mancene
Assistant Examiner—Daniel J. Leach
Attorney, Agent, or Firm—William R. Piper

[57] ABSTRACT

A removable converter for a standard fishing pole which may be connected thereto, the converter having a separate reel and line for lowering a weight to a desired depth in the water. The weight has a quick release catch for grasping the fish line and carrying the line and bait to a desired water depth at which point the operator can free the fish line from the quick release catch by a sudden pull on the line. The freed fish line with its bait will slowly rise in the water to attract the fish and the operator can retrieve the weight by operating the separate reel before or after a fish strikes the bait.

3 Claims, 2 Drawing Figures

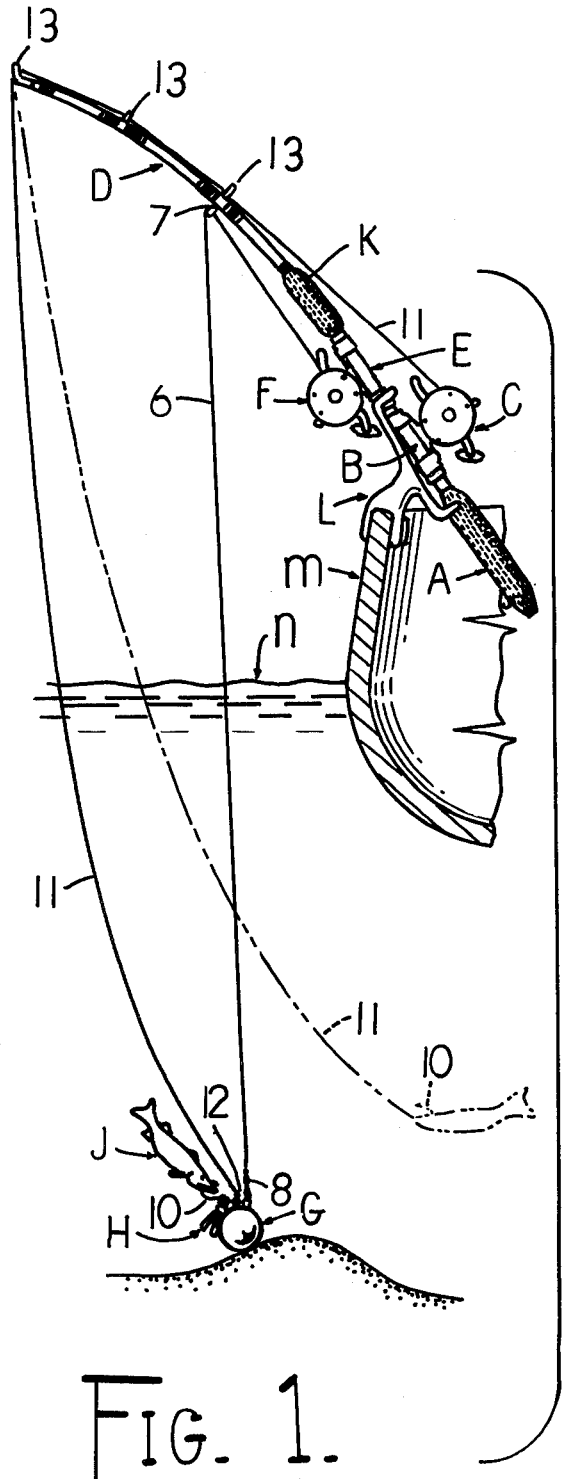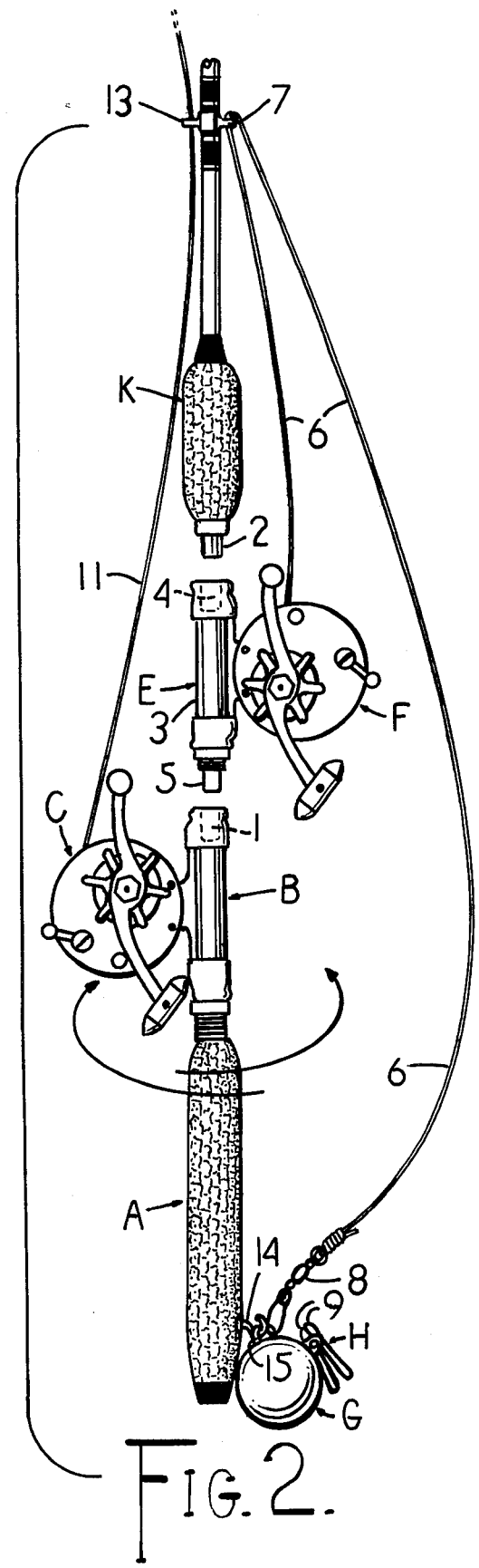
FIG. 1.
FIG. 2.

REMOVABLE CONVERTER FOR A FISHING POLE WITH AUTOMATIC RELEASE FOR FISHING LINE

BACKGROUND OF THE INVENTION

1. Field of the Invention

When fishing for salmon or other deep sea fish it is necessary to lower the fish line with its bait to a considerable depth in the water. It is the present practice to use a weight on the line in order to force the line and bait to the desired water depth. Then when a fish strikes the bait, the weight is released and lost. To overcome this disadvantage I have provided a weight that is permanently attached to an auxiliary line which is wound up on a high speed auxiliary reel. The auxiliary reel in turn is mounted on a short length of rod that can be quickly coupled into a stardard fishing rod when it is desired to go deep sea fishing for salmon or it can be quickly removed when the operator wishes to use his standard fishing rod in the usual manner. The weight has a quick release catch mounted on it to which the fish line may be temporarily attached so that the weight and catch can carry the fish line with its bait to the desired depth in the water whereupon the operator can free the fish line from the catch by merely giving a quick jerk on the fishing pole so as to pull the line free from the catch. The weight is not lost and it may be retrieved at any time by merely operating the high speed auxiliary reel for winding up the auxiliary line to lift the weight to where the operator may grasp it.

2. Description of the Prior Art

The patent to Harry A Loebensteen, U.S. Pat. No. 2,786,296, issued Mar. 26, 1957, on a trolling tackle discloses a sinker retrieving reel attached to a boat and carrying a bracket to which a conventional fishing pole is removably secured. The fish line from the fishing reel mounted on the pole has a sinker release attached thereto which in turn is releasably secured to the sinker. When the sinker reaches the desired water depth the operator can jerk the pole for causing the sinker release to free the sinker and the fishing line with its bait can be used in the normal manner for attracting a fish and causing it to strike the bait and be caught.

My present invention differs from the patent in that I use what I term a converter which may be removably attached to a standard two piece fishing pole. The converter carries a high speed reel and a weight supporting line is fed from this auxiliary reel and is passed through an auxiliary eyelet on the pole. The weight is permanently attached to the auxiliary weight supporting line and the weight preferably has a smooth jar release catch for temporarily holding the fishing line so that the fisherman can lower the weight with the fish line attached thereto until the desired water depth is reached whereupon the fisherman can give a slight jerk to the pole to free the fish line from the release catch. The weight can be immediately retrieved by winding up the weight auxiliary line on the high speed auxiliary reel or can do so after a fish strikes the bait and is caught.

SUMMARY OF THE INVENTION

An object of my invention is to provide a converter with a high speed auxiliary reel for retrieving a weight, the converter being designed to be readily and removably connected to a standard two part fishing pole. The weight carries a quick release catch for temporarily holding a fishing line so that the fisherman can lower the weight and fish line to the desired water depth and then free the line from the catch by giving a jerk to the pole.

BRIEF DESCRIPTION OF THE DRAWING

FIG. 1 is a side elevation of a two part fishing pole equipped with my converter and auxiliary high speed reel. The weight is indicated in deep water and carrying a smooth jawed quick release catch for gripping the fishing line. The fish pole is shown removably mounted in a holder that in turn is attached to the side of a boat.

FIG. 2 is an enlarged exploded view illustrating how the converter can be removably connected to a two part standard fishing pole.

DESCRIPTION OF THE PREFERRED EMBODIMENT

In carrying out my invention I make use of a standard two part fishing pole that has a handle A and a fishing rod portion B on which a fishing reel C is removably mounted. Any type of fishing reel may be used. The fishing rod portion B has a socket 1 at its outer end, see FIG. 2, for normally receiving the butt end 2 of the standard fishing rod D. The butt end 2 forms a friction tight fit with the socket 1. The standard fishing rod illustrated in the drawing comprises two parts, the handle A and the rod portion B comprising one part, and the rod D constituting the second part.

My invention includes a converter indicated generally at E which comprises a cylindrical member 3 with a socket 4 at one end for removably receiving the butt end 2 of the rod D. The member 3 also has a butt portion 5 at its other end that is removably receivable in the socket 1 of the rod portion B. The butt end 2 of the rod D has a friction fit with the socket 4 in the converter E and the butt end 5 of the converter E has a friction tight fit with the socket 1 in the rod portion B. In this manner the converter E can be quickly connected to the two part fishing pole.

The converter E has an auxiliary high speed reel F removably connected thereto in the usual manner. This reel F has a weight supporting and retrieving auxiliary line 6 that is passed through an eyelet 7 on the pole D and has its free end permanently connected to a weight G by a swivel 8, see both FIGS. 1 and 2. The weight in turn has a quick release snap action catch H that has smooth spring biased jaws 9 for gripping a fish hook 10 or it could grip a fish line 11. A swivel 12 connects the fish hook to the fish line 11. FIG. 1 shows the fish hook 10 baited with a minnow J. The fish line 11 extends from the fishing reel C, and is passed through a plurality of eyelets 13, mounted on the pole D.

Both FIGS. 1 and 2 illustrate the pole part D as having a hand grip K placed adjacent to the butt end 2 of the pole so as to permit the operator to grasp the hand grip when moving the butt 2 into the socket 4 in the converter E. It is possible to removably mount the fishing pole with my converter E in a pole holder L which in turn is attached to a boat m.

OPERATION

From the foregoing description of the various parts of the device, the operation thereof may be readily understood. FIG. 1 illustrates clearly how my converter E when mounted in a two part standard fishing pole can drop a weight G to a desired depth in a body of water n, and have the quick release catch H on the weight carry a baited fish hook 10 down to the same depth.

Then the fisherman can give a jerk to the fishing pole to pull the baited hook free from the smooth jaws of the catch and the line 11 with its baited hook will float free of the weight.

The fisherman can now immediately retrieve the weight G by rapidly winding the auxiliary weight supporting line 6 to lift the weight out of the water or he can first catch a fish before pulling in the weight. FIG. 2 shows the handled A with a hook 14 for receiving an integral eyelet 15 on the weight G whereby the retrieved weight can be temporarily secured to the handle.

My converter E is useable on light weight fishing equipment or it can be used on heavy duty equipment. There is no limit to its use. Any kind of bait can be used, such as a minnow, anchovie, sardine, etc., or a fish lure could be used. It is possible to rotate the handle A and fishing pole as indicated by the arrows in FIG. 2 to bring either the fishing reel F or the auxiliary high speed weight retrieving reel C into a position where either one can be readily operated. Also, either reel can be operated without the necessity of bringing either one into a better position for operation. The quick release catch H has smooth jaws for gripping the baited hook 10 or the fish line 11 so that a quick jerk on the fishing line will free it from the catch.

It will be seen that my device makes it possible to move the baited hook down to the bottom of the body of water or down to any desired water depth without a constant weight hanging on the fishing line to hinder the natural free action of the bait. The reel system can use 6 pound test line up to 1,000 pound test line and it makes no difference. If the fisherman wishes to have a slower ascent of the baited hook, he can add 1 or 2 ounces of lead twists to the fishing line adjacent to the swivel 8. The drawing shows a few eyelets 13. It is possible to add as many eyelets as desired to the pole to make the fish line move more smoothly along the pole. The catch H is shown mounted on the exterior of the weight. It is obvious that the catch could be countersunk in the weight so as to provide a relatively smooth exterior to the weight.

I claim:

1. In combination:
   a. a fishing pole having a handle and fishing reel removably connected to the pole;
   b. said fishing reel having a fish line adapted to be wound on the reel;
   c. a converter having a weight retrieving reel mounted thereon and having a weight retrieving line adapted to be wound thereon;
   d. a weight connected to the weight retrieving line and having a quick release catch thereon for gripping the fishing line adjacent to the baited hook on the line;
   e. and means for removably connecting said converter to said handle and to said pole.

2. The combination as set forth in claim 1: and in which
   a. said fishing pole has a hand grip disposed adjacent to the end of said pole that lies adjacent to said converter;
   b. whereby said converter can first be connected to said handle and then the hand grip can be grasped when connecting the pole to the converter.

3. The combination as set forth in claim 1: and in which
   said means for removably connecting said converter to said handle includes a butt and socket connection.

* * * * *